W. M. DEMING.
ANIMAL DOSING DEVICE.
APPLICATION FILED MAR. 30, 1918. RENEWED MAR. 22, 1919.
1,315,474.
Patented Sept. 9, 1919.
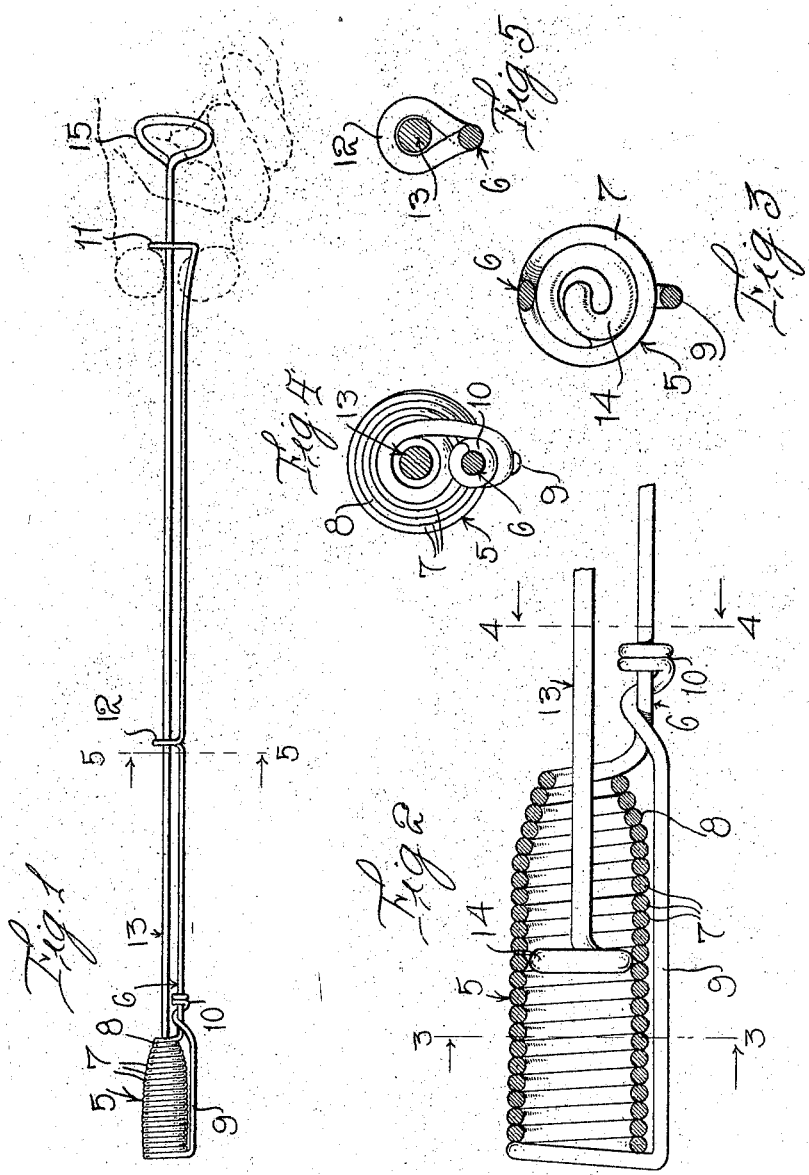
Inventor
William M. Deming.
By Watson E. Coleman
Attorney

UNITED STATES PATENT OFFICE.

WILLIAM M. DEMING, OF FAIRVIEW, MONTANA.

ANIMAL-DOSING DEVICE.

1,315,474.      Specification of Letters Patent.      Patented Sept. 9, 1919.

Application filed March 30, 1918, Serial No. 225,811. Renewed March 22, 1919. Serial No. 284,514.

*To all whom it may concern:*

Be it known that I, WILLIAM M. DEMING, a citizen of the United States, residing at Fairview, in the county of Richland and State of Montana, have invented certain new and useful Improvements in Animal-Dosing Devices, of which the following is a specification, reference being had to the accompanying drawings.

This invention relates to an improved animal dosing device and has for its primary object to provide a simply constructed device which may be easily and quickly manipulated for inserting a capsule or other medicament into the throat of an animal.

It is one of the important objects of my invention to provide an animal dosing device of such construction that all liability of injury or physical discomfort to the animal when the device is inserted into its throat is obviated.

It is also another object of the invention to provide an animal dosing device which will be very light in weight and at the same time strong and rigid and capable of manipulation by the use of one hand of the operator with ease and facility.

And the invention also has for one of its objects to provide a device as above characterized which may be manufactured at relatively small cost, and which can therefore be furnished by the manufacturer of medicaments as an inducement for the purchase of the latter.

With the above and other objects in view, the invention consists in the improved combination, construction and relative arrangement of the several parts as will be hereinafter more fully described, subsequently claimed and illustrated in the accompanying drawing in which similar reference characters designate corresponding parts throughout the several views and wherein;

Figure 1 is a side elevation of an animal dosing device constructed in accordance with the preferred embodiment of my invention;

Fig. 2 is an enlarged longitudinal section through the cylindrical barrel in which the capsule or other medicament is inserted;

Fig. 3 is a section taken on the line 3—3 of Fig. 2;

Fig. 4 is a section taken on the line 4—4 of Fig. 2; and

Fig. 5 is a section taken on the line 5—5 of Fig. 1.

Referring in detail to the drawing, 5 designates generally the barrel or cylinder into which the capsule or other medicament is adapted to be inserted. This barrel is formed of a multiplicity of coils 7 which are turned in a wire 6 in spaced relation to one of its ends. The coils 7 are closely engaged with each other and from one end of the barrel to a point adjacent its opposite ends, these coils are of uniform diameter. The remaining coils at the latter end of the barrel are gradually decreased in diameter so as to provide the barrel with a tapering inner end designated 8. From the smaller coil at the tapering end of the barrel, the wire 6 is longitudinally extended. The end portion of the wire is also longitudinally extended from the opposite end of the barrel, exteriorly of the latter as indicated at 9 and has its terminal tightly coiled and clenched from the wire 6, as shown at 10. This wire 6 at its other end is formed into a large eye or loop 11. At a point between this loop 11 and the barrel 5, an eye 12 is formed in the wire 6.

13 designates the ejecting member which is also formed from a wire rod somewhat heavier than the wire 6. This rod is engaged through the guide eye 12 and extends at one of its ends into the barrel 5. This end of the wire rod 13, has a coil 14 formed thereon which is of slightly less diameter than the interior diameter of the main portion of the barrel 5 and is of greater diameter than the tapering end 8 of said barrel. The other end of the ejecting rod which extends through and beyond the loop 11 is formed into an elongated loop 15 which is of such dimensions that it cannot pass through the loop 11 on the end of the wire 6.

In the use of the device, the eye 14 on the end of the ejecting member is positioned in the inner end of the barrel 7, and the capsule or other medicament is then inserted into this barrel and against said coil. The operator then firmly grasps the wires 6 and 13 inwardly of the loop 11, and thrusts the wire barrel into the throat of the animal. He then engages the palm of his hand against the terminal loop 15 on the wire ejecting member and with his thumb and forefinger, pulls upon the loop 11 whereby the barrel 5 is withdrawn from the animal's throat relative to the terminal coil 14 of the wire ejecting member and the capsule or other medicament is thus ejected from the barrel into the animal's throat. In this manner the medicament may be easily and quickly administered with a minimum of manual labor or exertion upon the part of the operator and with no discomfort to the animal. By forming the medicament receiving barrel in the wire 6 in the manner above explained, there are no sharp projecting points which can cut into or otherwise injure the throat of the animal. It is primarily for this reason that the wire is extended from the open end of the barrel, as at 9. In this connection, it is also of importance to note that by twisting the extremity of the portion 9 of the wire on the body wire 6 at the inner end of the barrel, the dilation or expansion of the end coils of the barrel is obviated and the rigidity of the structure as a whole is thereby greatly increased. I have found the device to be highly serviceable and convenient in practical use, and by means of the same medicine in various forms may be administered to a large number of animals without waste and in a very expeditious manner. The article as a whole is constructed from only two large pieces of wire, and can manifestly be produced at small manufacturing cost. It is also very rigid and therefore strong and durable, and at the same time light in weight so that it may be readily manipulated with the use of one hand.

While I have herein shown and described the preferred form and construction of the several parts of the device it is nevertheless to be understood that the same are susceptible of considerable modification, and I therefore reserve the privilege of adopting all such legitimate changes as may be fairly embodied within the spirit and scope of the invention as claimed.

I claim:

1. An animal dosing device including a medicament receiving barrel formed of a plurality of closely engaged wire coils, the coils gradually decreasing in diameter at one end of the barrel, and the wire being longitudinally extended from the smaller coil, said wire having a terminal loop and a guide eye formed in the wire between the barrel and said terminal loop, and a wire rod extending through said loop and the guide eye and having ejecting means formed on one of its ends operatively engaged in said barrel.

2. An animal dosing device including a medicament receiving barrel formed of a plurality of closely engaged wire coils, the coils gradually decreasing in diameter at one end of the barrel, and the wire being longitudinally extended from the smaller coil, said wire having a terminal loop and a guide eye formed in the wire between the barrel and said terminal loop, and a wire rod extending through said loop and the guide eye and having a single coil formed on one of its ends operatively engaged in the barrel to eject the medicament therefrom, said rod being provided with a hand engaging loop on its other end.

3. An animal dosing device including a medicament receiving barrel formed of a plurality of closely engaged wire coils, said coils gradually decreasing in diameter at one end of the barrel and the wire being longitudinally extended from the smallest coil, said wire at the opposite end of the barrel being longitudinally extended along the barrel exteriorly thereof and having its terminal clenched upon said wire beyond the inner end of the barrel, and a medicament ejecting member engaged within the barrel.

4. An animal dosing device including a wire coiled to form a medicament receiving barrel, the wire being extended longitudinally from one end of the barrel and said extension at its terminal fixed to the wire at the opposite end of said barrel.

5. An animal dosing device including a wire coiled to form a medicament receiving barrel having an open discharge end, said wire being longitudinally extended from said discharge end of the barrel, the terminal of said extension being fixed to the wire.

6. An animal dosing device including a medicament receiving barrel formed of a plurality of closely engaged wire coils, the wire at one end of the barrel being longitudinally extended and clenched upon the wire at the opposite end of the barrel, and a medicament ejecting member in said barrel.

In testimony whereof I hereunto affix my signature in the presence of two witnesses.

WILLIAM M. DEMING.

Witnesses:
JOHN A. BIRD,
O. H. HALVERSON.

Copies of this patent may be obtained for five cents each, by addressing the "Commissioner of Patents, Washington, D. C."